US009128491B2

(12) United States Patent
Kremer et al.

(10) Patent No.: US 9,128,491 B2
(45) Date of Patent: Sep. 8, 2015

(54) REGULATOR FOR CORROSIVE GAS TAPPING IN UNDER-ATMOSPHERIC CONDITIONS

(75) Inventors: Paul Kremer, Luxembourg (LU); Paul Muzzo, Yutz (FR); Morgan Lamiable, Rehon (FR)

(73) Assignee: Luxembourg Patent Company S.A., Luxembourg (LU)

( * ) Notice: Subject to any disclaimer, the term of this patent is extended or adjusted under 35 U.S.C. 154(b) by 456 days.

(21) Appl. No.: 13/125,444

(22) PCT Filed: Oct. 21, 2009

(86) PCT No.: PCT/EP2009/063829
§ 371 (c)(1),
(2), (4) Date: Apr. 21, 2011

(87) PCT Pub. No.: WO2010/046409
PCT Pub. Date: Apr. 29, 2010

(65) Prior Publication Data
US 2011/0203683 A1 Aug. 25, 2011

(30) Foreign Application Priority Data
Oct. 21, 2008 (LU) .......................................... 91490

(51) Int. Cl.
*G05D 16/06* (2006.01)
(52) U.S. Cl.
CPC ....... *G05D 16/0663* (2013.01); *Y10T 137/7922* (2015.04)
(58) Field of Classification Search
CPC ...................... G05D 16/0663; Y10T 137/7922
USPC ............. 137/505.14, 505.39, 505.41, 505.42, 137/505.43, 505.44, 505.45
See application file for complete search history.

(56) References Cited

U.S. PATENT DOCUMENTS

| 191,402 | A | * | 5/1877 | Chase | ......................... 137/505.4 |
| 1,521,765 | A | * | 1/1925 | Guerrant | .................. 137/505.43 |

(Continued)

FOREIGN PATENT DOCUMENTS

| EP | 0166826 A1 | 1/1986 |
| EP | 0108972 B1 | 7/1987 |

(Continued)

OTHER PUBLICATIONS

International Search Report from PCT/EP09/63829.

*Primary Examiner* — William McCalister
(74) *Attorney, Agent, or Firm* — James E. Walton

(57) ABSTRACT

The invention relates to a device for regulating a pressurized gas, said device including: a stopper (4) engaging with a seat (5) and capable of closing a pressurized gas passage; a so-called low-pressure chamber (29) downstream from the seat (5), the low-pressure chamber including a plate (27) to which the stopper (4) is coupled, and the plate being subjected to the force of a spring (30) housed in said chamber (29) and arranged concentrically relative to the seat (5) and the fastening means (28) thereof. The chamber (29) is defined by a diaphragm (26) in free contact with the plate (27). The opposite surface of the diaphragm (26) is subjected to the force of a spring (20) having a prestress which is adjustable via control means (13, 14). The control means are indexed according to two positions: a first prestress release position for ensuring the closure of the device at the stopper (4), and a second calibrated prestress position of the diaphragm (26) corresponding to the regulator operational position. A sealed chamber (24) defined by the surface of the membrane (26) opposite the low-pressure chamber (29) is formed by the prestress control means for ensuring the connection to a detector for detecting the presence of a leak or of the used gas in order to detect a potential leak at the diaphragm.

14 Claims, 1 Drawing Sheet

(56) References Cited

U.S. PATENT DOCUMENTS

| | | | |
|---|---|---|---|
| 1,637,764 A * | 8/1927 | Coles | 137/505.41 |
| 1,659,263 A | 2/1928 | Harris | |
| 2,318,721 A * | 5/1943 | Siver | 137/454.5 |
| 2,664,674 A | 1/1954 | Niesemann | |
| 2,718,237 A | 9/1955 | Matasovic | |
| 2,766,752 A * | 10/1956 | Meidenbauer, Jr. | 128/204.26 |
| 2,969,801 A * | 1/1961 | Cummins | 137/81.1 |
| 3,068,883 A * | 12/1962 | Brumm | 137/116.5 |
| 3,094,141 A * | 6/1963 | Maienknecht | 137/505.25 |
| 3,135,281 A * | 6/1964 | Morgan | 137/110 |
| 3,233,651 A * | 2/1966 | Smith | 137/115.27 |
| 5,657,787 A * | 8/1997 | Diehl et al. | 137/116.5 |
| 8,851,107 B2 * | 10/2014 | Risse | 137/505.12 |

FOREIGN PATENT DOCUMENTS

| | | |
|---|---|---|
| FR | 377817 A | 9/1907 |
| GB | 723793 | 2/1955 |
| WO | WO 2009003994 A1 * | 1/2009 |

* cited by examiner

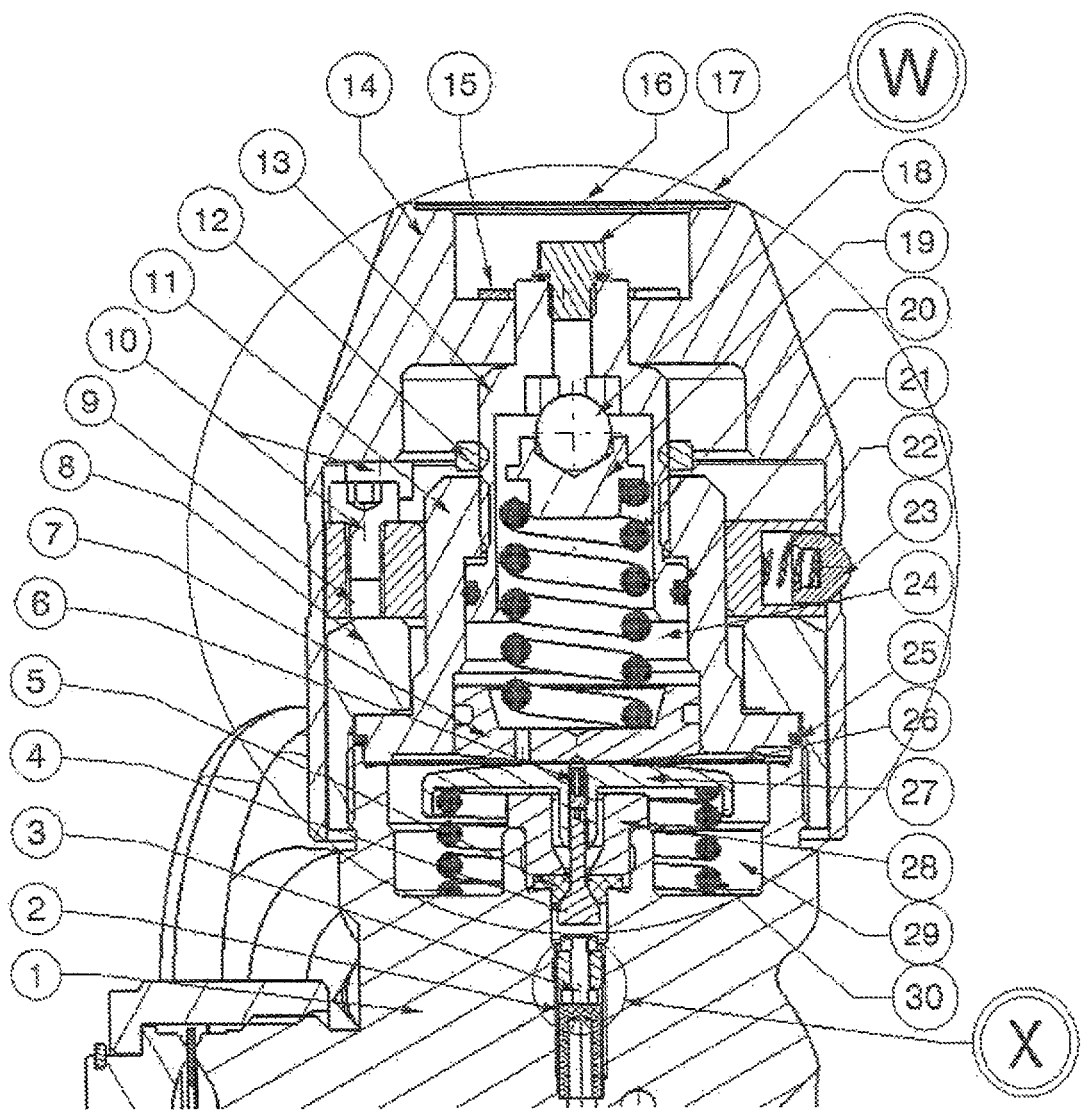

REGULATOR FOR CORROSIVE GAS TAPPING IN UNDER-ATMOSPHERIC CONDITIONS

TECHNICAL FIELD

The present invention relates to a device for regulating a pressurized gas, more particularly to a device for regulating corrosive and/or toxic pressurized gas particularly used in the semi-conductor industry and whose tapping is preferably carried out under subatmospheric pressure conditions.

PRIOR ART

Most gases used in the semi-conductor industry are used at constant pressure at a level greater than atmospheric pressure but they are generally delivered toward production lines at a pressure equal to or less than atmospheric pressure. These gases are indeed stored in bottles either by absorption on a solid medium or under pressure in gaseous form. In the first case, it is necessary to have a pressure under atmospheric level at the top of the bottle in order to release the gas absorbed on the medium. This requires a device at the level of the production line adapted to generate the necessary vacuum while controlling the flow rate brought to the production. In the second case, if it is desired to be connected to the device describe hereinabove, for the gas absorbed on a solid medium, the pressure and the flow rate of gas stored under pressure when the latter is tapped at a lower pressure than the atmospheric pressure must be able to be regulated.

Other constraints are imposed on the aforementioned application type, namely, that the space available for the regulation device is limited. Indeed, certain standards of bottle configuration have been developed for the first type of gas storage by absorption. This type of bottle comprises a simple valve at the top of the bottle since all the regulation happens downstream via the device generating the vacuum and controlling the flow rate. For security reasons, a cap having a standardized configuration is present at the top of the bottles in order to protect the valve. The space, reserved for the valve in this standardized cap, is rather reduced because of the simplicity of the valve to protect. In the case of gas stored under pressure, the regulation device necessary to the proper functioning with the existing tapping devices must be able to be housed in the same cap, which imposes space constraints.

Document GB 723, 793 (FIG. 3) discloses a device for regulating gas adapted to maintain a subatmospheric pressure when the output of the device is connected to a vacuum pump. This device comprises a pre-stressed stopper in the direction of the closing by a counterweight as well as a piston with a membrane and to which the stopper is coupled. The vacuum created by the vacuum pump on the output side generates a counter-force on the piston opposite the pre-stress of the counterweight. This counter-force causes the piston and the stopper to move downward in the opening direction. This device is however not provided to be connected to a source of pressurized gas. In addition, its design is rather bulky. Its membrane is made of elastomeric material, of the rubber type, for example, so that it is not adapted to regulate gases that are corrosive and under high pressure.

Document EP 0 108 972 discloses a device for regulating a combustible gas stored in liquid phase under pressure. It comprises a stopper with a spring on the high pressure side exerting a closing force on the stopper. The latter is in equilibrium with a control rod coupled to a membrane that is subjected to an opposing elastic force. Although the principle of this device allows for an interesting regulation, it is not adapted to corrosive and/or toxic gases because, among other things, of the elastomeric membrane.

Document EP 0 166 826 A1 discloses a pressurized gas regulator comprising a cartridge in the high-pressure part. This cartridge comprises a conical stopper and a seat, both cooperating in a leakproof manner so as to regulate the pressure and/or flow rate at the output of the regulator. The stopper comprises a nipple extending in the low pressure part downstream of the seat. This nipple is in contact with a membrane. An adjustable pre-stress device exerts a force on the surface of the membrane opposite the nipple of the stopper. This device enables a precise regulation but presents drawbacks in view of the application described hereinabove. Indeed, the presence of the cartridge brought in the high pressure part artificially increases the length of the high pressure part and thus of the device.

Because of the constraint of reduced available space, it is common to provide for the regulation or release part to be in the bottle itself. This allows for an effective space-savings above the bottle but has the major drawback of it not being easy to work on the regulator, for example for calibrating and/or adjusting purposes.

DESCRIPTION OF THE INVENTION

The object of the invention is to provide a regulation device adapted to ensure the services described hereinabove and overcoming the drawbacks taught by the cited documents, namely a device for regulation pressurized gas, comprising a body with a passage adapted to be connected to a pressurized gas; a stopper, movable in translation along an axis and adapted to cooperate in a leakproof manner with a seat provided in the passage; a movement of the stopper essentially in the flow direction of the fluid corresponding to a movement for closing the passage; first elastic means exerting a force on the stopper in the direction for closing the passage; a low-pressure chamber downstream of the seat and stopper, the low-pressure chamber being defined by a membrane fixed to the body, the membrane being adapted to move as a function of the pressure in said chamber and to control the stopper, thus making it possible to regulate, in said chamber, the flow rate and/or pressure of the pressurized gas; whereby the elastic means are housed in the low-pressure chamber.

Such an arrangement of the elastic means in the low-pressure chamber allows for utilizing a space, available anyway, and thus to save space downstream of the stopper. This arrangement further enables housing a spring having a larger diameter and being more powerful, thus contributing to increasing the leakproofness between the stopper and the seat. It thus makes it possible to not have a closing valve at a high pressure level and thus to save space.

Preferably, said chamber comprises a movable piece in contact with the membrane and rigidly connected to the stopper.

Preferably, the first elastic means act on the movable piece in contact with the membrane.

Preferably, the movable piece contacts the membrane freely.

Preferably, the movable piece has the general shape of a plate, preferably circular, one surface of which is in free contact with the membrane and the other surface receives the first elastic means, the stopper being coupled to the plate.

Preferably, the stopper comprises an elongated portion downstream of the seat in said chamber, this elongated portion being threaded and engaged by screwing with the movable piece.

Preferably, the elastic means comprise a first spring surrounding at least partially the stopper.

Preferably, the first spring is arranged concentrically relative to the axis of the stopper, supported on a lower portion of said chamber along the axis of the stopper, said lower portion being essentially at the level of the seat or at a lower level downstream of the seat.

Preferably, the device comprises second elastic means acting on the surface of the membrane opposite the movable piece.

Preferably, the device comprises means for regulating the force exerted by the second elastic means.

Preferably, the adjustment means are indexed with an index corresponding to a pre-stress of the second elastic means in a working position of the regulation device.

Preferably, the adjustment means are such that they make it possible to decrease the pre-stress of the second elastic means so as to place the device in closing.

Preferably, the device comprises a second spring, one end of which acts on the surface of the membrane opposite the movable piece and the other end of which is supported on an adjustable abutment, the abutment being adjustable in displacement along the axis of the stopper.

Preferably, the device comprises a control wheel controlling the adjustable abutment and having an working position of the indexed regulation device by means of a mechanical system.

Preferably, the mechanical indexation system comprises a push button housed under an essentially cylindrical portion of the control wheel and adapted to cooperate with an orifice of said essentially cylindrical portion of the control wheel.

BRIEF DESCRIPTION OF THE DRAWINGS

FIG. 1 is a cross-sectional view of the regulation part, per se, of the device according to the invention.

BEST EMBODIMENT OF THE INVENTION

In the remainder of the description, the terms indicating the positions of different components of the device such as "upper", "lower", "top", "bottom", "vertical", . . . must be understood with respect to the representations of the device according to the FIGURE, and not necessarily with respect to the position on the implementation. Indeed, the device described can be mounted in other positions than that illustrated in the FIGURE.

The regulation device comprises, from a functional standpoint, starting from the tube projecting into the bottle, a valve and a filling connection of the bottle, a filter, a reducer or regulator, a valve and an output connection. Not having a closing valve upstream of the regulator makes it possible to save space along the main axis of the device. The role of closing valve allowing for isolating, in a sure manner, the low-pressure portion of the device from the high-pressure portion of the device, is carried out by the regulator, more particularly by its stopper.

The regulator W shown in cross-section in FIG. 1 comprises a body 1 corresponding generally to the body of the device. A passage is machined in this body, essentially along its longitudinal axis and in which a filter 2 is housed. The filter 2 is a hollow cylindrical element made of porous material, conventionally sintered metallic material, one end of which is open and the other closed. It is housed in a boring housed in the through-hole of the passage. The lower portion of this boring has a diameter corresponding essentially to the outer diameter of the filter, whereas the remainder of the boring, that is the upper portion, has a slightly greater diameter, so as to create a chamber around the filter. The filter is mounted by insertion from the top downward according to the FIGURE and is kept in place abutting at the bottom of its housing by a threaded and hollow element 3 screwed in a portion of the boring, threaded for this purpose. It must be noted that the diameter of the portion of this element which is in contact with the filter 2 is less than that of the boring in which the filter and the element are housed, so as to form an extension of the chamber formed between the filter and the boring. Lateral passages (not shown) are provided in the area of this lower portion of the element 3.

A stopper 4 and a seat 5 are provided in the upstream passage of the filter 2. The stopper and the seat are designed so as to be able to ensure a leakproof closing of the passage of gas. The seat 5 is positioned in the passage of gas downstream of the filter and maintained by a collar 28 screwed in a threaded housing of the body 1. The body 1 comprises a boring, concentric to the main passage of gas and forms, downstream of the stopper 4 cooperating with the seat 5, a low-pressure chamber 29. This chamber 29 is defined by the cavity formed in the body 1, as well as by a membrane 26. The latter closes the cavity of the body in a leakproof manner, with the exception of a passage, not shown, connecting the chamber 29 with the output of the device.

The low-pressure chamber 29 further comprises a plate 27 to which the stopper 4 is coupled. A spring 30 is housed pre-stressed between the bottom of the cavity of the body and the lower surface of the plate 27. The upper and cylindrical portion of the stopper is threaded and comprises, at its upper end, a slot for cooperating with a screwdriver. The plate 27 comprises a roughly cylindrical portion along the longitudinal axis of the device (corresponding to its axis of symmetry) extending downward. This portion comprises a through-hole extending through along the longitudinal axis, this through-hole being threaded in order to cooperate with the threaded portion of the stopper. A screw 6 serving as a blocking counter-screw is provided on top of the upper end of the stopper 4. During the assembly, the seat 5 and the stopper 4 are set in place from the top of the body 1, the collar 28 is then pressurized and an adapted appropriate screwdriver is inserted in the through-hole of the plate so as to cooperate with the slot of the upper end of the stopper 4. The stopper is then set in rotation by the screwdriver in order to be screwed in the hollow cylindrical portion of the plate 27. Once the stopper has been correctly attached and positioned with respect to the plate 27, the counter-screw 6 is screwed and blocked on top of the upper end of the stopper.

The membrane 26 made of a metallic material is arranged in a boring of the body 1 and freely contacts the upper surface of the plate 27. An upper element 11 of the bell-shaped device is in contact with the periphery of the upper surface of the membrane 26. A nut 8 supported on the upper element 11 is screwed on the body 1 in order to pressurize the membrane 26 between the body 1 and the upper element 11. A joint 25 ensures the leakproofness between these two elements.

The upper element 11 of the device comprises a boring on its lower portion in which a piston 7 is slidably housed. This piston 7 freely contacts the upper surface of the membrane 26 and is subjected to a force directed toward the membrane by an adjustable pre-stressing device. The travel described by the piston 7 in operational mode is short and corresponds essentially to that of the membrane 26 and of the plate/stopper assembly. The piston 7 comprises a portion, hollowed on its upper surface adapted to receive a spring 20 of the adjustable pre-stressing device.

The upper element 11 of the device comprises a female threading at its upper portion. A screw 13 for adjusting the pre-stressing is engaged in the threading of the upper element 11. Its upper portion is machined so as to cooperate in tight rotation with a control wheel 15 fixed by means 15. The adjustment screw 13 has a hollow lower portion. A contact ball 18, an intermediate piece 19 and partially the spring 20 are housed in this hollow portion. The manipulation in rotation of the control wheel 14 causes the adjustment screw 13 to lower or rise and thus act on the pre-stressing of the spring 20.

A ring 9 is slid over the outer cylindrical portion of the upper element 11 of the device. This ring 9 comprises, at is periphery, a push button adapted to cooperate with two orifices provided in the control wheel 14. A first orifice (shown in FIG. 1) corresponds to a position where the pre-stress is released and a second orifice, offset by about ¾ turn, corresponds to a pre-stressing and working position of the device. The push button comprises a button 23, per se, slidably housed in a cavity in the form of a boring formed in the outer surface of the ring 9. A spring 22 is housed in the cavity and pushes the button elastically toward the outside. The button is adapted to make a radial translational movement with respect to the ring 9. The ring 9 is angularly adjustable with respect to the upper element 11 and is kept in position by a countersunk screw of the needle type (not shown) screwed radially and exerting a radial pressure on the outer surface of the upper element 11.

Two screws 10 serve as mutual abutments in order to limit the rotation of the control wheel in the direction for unscrewing or mounting the screw 13. One of these screws 10 is screwed within the ring 9 and the other is screwed within the cavity of the control wheel 14. The abutment ensured by the screws 10 limits the rotation of the control wheel (and therefore of the screw 13) in the unscrewing or mounting direction of the screw beyond the indexed position determined by the push button and the first orifice corresponding to a release position of the pre-stress.

A nut 12 is screwed and fixed, either via a locknut or by gluing, on the screw 13, exactly facing the high portion of the upper element 11 and constitutes an abutment limiting the screwing or the lowering of the screw 13 beyond the indexed position determined by the push button and the second orifice corresponding to a working position of the device.

The regulation device described comprises two indexed positions of the control wheel.

The first position (corresponding to FIG. 1) where the push button engages the first orifice of the control wheel corresponds to a release of the force of the spring 20 on the membrane. The counter effort acting via the membrane 26 on the plate 27 is at least partially released. A large part of the force exerted by the spring 30 on the plate is transmitted to the stopper 4. This force is directed toward the top and pulls the stopper 4 against the seat 5, thus ensuring the closing of the device. This position corresponds to the mode referred to as the transport mode of the device. In case of a leak between the seat and the stopper, the pressure in the low-pressure chamber closed downstream by the valve increases and displaces the membrane toward the top. This displacement releases the pre-stressing force further and thus increases the part of the force of the spring 30 transmitted to the stopper. This tends to reinforce the closing in the area of the seat.

It is preferable for the stopper to not be coupled to the membrane since, in case of a leak, the consequence would be that the increase of pressure in the low-pressure chamber 29 would exert forces on the stopper such that they would deform and disrupt the regulator. In the configuration of FIG. 1, the maximum force which can be exerted on the stopper is limited to the force of the spring 30. This limit would be reached if the pressure in the chamber 29 were to cause the membrane to become unglued from the plate 27.

The second position (not shown) whereby the push button engages the second orifice of the control wheel corresponds to a calibrated pre-stress of the spring 20 actuating the regulator in working mode. In this position, the forces of the two springs 20 and 30 are balanced according to different parameters such as, for example, the working surface of the membrane, the different frictions, and the shape of the seat and stopper, so as to obtain the desired regulation. As a function of the parametering of these different elements, the regulator obtained can be "negative", that is, allowing for a flow rate only at output pressures below the atmospheric level such as required for certain applications in the semi-conductor industry, or the regulator can be "positive", that is, allowing for a gas flow rate in a determined range of pressure and/or output flow rate.

The device described has the advantage of not requiring a valve closing on the high-pressure side, this role being fulfilled by the stopper of the regulator. The pre-adjusted working position of the regulator can be regained at any time thanks to the indexed control device. This arrangement allows for space-savings as well as easy access to different adjustment elements of the regulator, namely a ring 9 cooperating via the push button with the two orifices, and the nut 12 serving as abutment for the working position. An orifice, not shown, is provided in the control wheel in order to access the needle screw (also not shown) for blocking the ring with respect to the bell element 11.

The control screw 13 comprises, on its lower portion, a leakproof connection 21 with a boring in the bell element 11. The top of the control screw 13 is closed by a screw 17 and a seal. A leakproof chamber 24 is thus formed, extending from the upper surface of the membrane 26 up to the screw 17. In addition, the piston 7 comprises a connection orifice between its upper and lower surfaces. The effect of these (measures is to make it possible to monitor the leakproofness of the membrane when the device is in closed position or in what is referred to as the transport position. Indeed, in case of a leak between the stopper and the seat and also in the area of the membrane, the gas filling the low-pressure chamber 29 at the output of the valve will spread in the chamber 24. The output of this chamber thus only has to be connected in the area of the screw 17 to a gas detector to detect a leak at the level of the membrane. In the working position, that is of calibrated pre-stress of the spring 20, the screw 17 must be removed in order to prevent any unwanted pressure in the chamber 24 which otherwise would influence the behavior of the regulator.

A device for regulating pressurized gas comprising a pressurized gas input, a stopper adapted to close the pressurized gas input, a low-pressure chamber downstream of the stopper is also disclosed; the low-pressure chamber being defined by a membrane acting on the stopper to regulate the flow rate and/or pressure of the pressurized gas, a leakproof auxiliary chamber defined by the membrane surface opposite the low-pressure chamber adapted to be connected to a gas detector.

Preferably, the device comprises a closing valve at the output of the low-pressure chamber.

Preferably, the device comprises a device of adjustable pre-stressing of the membrane comprising the auxiliary chamber.

Preferably, the adjustable pre-stressing device of the membrane comprises a control screw of the elastic means, the control screw cooperating in a leakproof manner with a stationary element so as to control the elastic means.

Other characteristics can be taken from the portion of the detailed description of FIG. 1 relative to the leakproof chamber 24.

A method using a regulation device such as defined hereinabove consisting in placing the device in a state whereby the stopper closes the pressurized gas input and connecting the auxiliary chamber to a gas detector is also disclosed. This situation conventionally corresponds to a mode referred to as "transport", whereby the device is closed and a possible leak at the level of the stopper and of the membrane can be detected. This arrangement could also be envisioned in service in order to detect a leak at the level of the functioning membrane.

The invention claimed is:

1. Device for regulating pressurized gas comprising
a body with a passage adapted to be connected to a pressurized gas;
a stopper, movable in translation along an axis and adapted to cooperate in a leakproof manner with a seat provided in the passage; a movement of the stopper in the flow direction of the fluid corresponding to a movement for closing the passage; the stopper comprising an elongated threaded portion extending downstream of the seat;
a plate comprising a threaded through hole which the threaded portion of the stopper engages;
a blocking counter-screw in the threaded through-hole of the plate;
first elastic means exerting a force on the plate and the stopper in the direction for closing the passage;
a low-pressure chamber downstream of the seat and of the stopper, the low-pressure chamber being defined by a cavity formed in the body and by a membrane fixed to the body and freely contacting the plate, the membrane being able to move as a function of the pressure in said chamber and to control the stopper, thus making it possible to regulate in said chamber the flow rate and/or pressure of the pressurized gas; the first elastic means being housed in the low-pressure chamber;
wherein the first elastic means is supported at a bottom surface of the cavity of the body defining the low-pressure chamber; and
wherein the bottom surface of the cavity of the body defining the low-pressure chamber surrounds the seat and is at a level of the seat or at a lower level that is upstream of the seat; and
wherein the bottom surface of the cavity of the body defining the low-pressure chamber forms a circular recess housing the first elastic means.

2. Device according to claim 1, characterized in that the first elastic means comprise a first spring at least partially surrounding the stopper.

3. Device according to claim 2, characterized in that the first spring is arranged concentrically with respect to the axis of the stopper, supported on a lower portion of said chamber along the axis of the stopper, said lower portion being at the level of the seat or at a lower level that is upstream of the seat.

4. Device according to claim 1, characterized in that it comprises second elastic means acting on the surface of the membrane opposite the plate.

5. Device according to claim 4, characterized in that it comprises means for adjusting the force exerted by the second elastic means.

6. Device according to claim 5, characterized in that the adjustment means are indexed with an index corresponding to a pre-stress of the second elastic means in a working position of the regulation device.

7. Device according to claim 6, characterized in that the adjustment means are such that they make it possible to decrease the pre-stress of the second elastic means so as to close the device.

8. Device according to claim 5, characterized in that the adjustment means are indexed with an index corresponding to a position for closing the device whereby the force exerted by the second elastic means is released.

9. Device according to claim 1, characterized in that it comprises a second spring whose one end acts on the surface of the membrane opposite the plate and whose other end is supported on an adjustable abutment, the abutment being adjustable in displacement along the axis of the stopper.

10. Device according to claim 9, characterized in that it comprises a control wheel controlling the adjustable abutment and having a working position of the regulation device that is indexed by means of a mechanical indexation system.

11. Device according to claim 10, characterized in that the indexation system comprises a position for closing the device whereby the force exerted by the second elastic means is released.

12. Device according to claim 10, characterized in that the mechanical indexation system comprises a push button housed under an essentially cylindrical portion of the control wheel and adapted to cooperate with at least one orifice of said essentially cylindrical portion of the control wheel.

13. Device according to claim 1, characterized in that the cavity of the body defining the low-pressure chamber comprises a raised central portion extending from the bottom of said cavity, said raised central portion housing the stopper and the seat.

14. Device according to claim 13, characterized in that the raised central portion comprises a collar retaining the seat in the central portion, the elongated threaded portion of stopper extending through a passage in the cap.

* * * * *